United States Patent
Pessina

[11] 3,759,977
[45] Sept. 18, 1973

[54] METHOD FOR PREPARING TETRA-N,N,N',N'-(2-HYDROXYETHYL)-ETHYLENEDIAMINE TETRANITRATE AND SALTS THEREOF

[76] Inventor: Raffaele Pessina, Via De Ambrosis 6, Novi Ligure, Italy

[22] Filed: Oct. 7, 1971

[21] Appl. No.: 187,541

[52] U.S. Cl. .................................. 260/467, 424/298
[51] Int. Cl. ............................................ C07c 77/02
[58] Field of Search ..................................... 260/467

[56] References Cited
UNITED STATES PATENTS
2,864,853  12/1958  Bachman et al. .................... 260/467
2,957,021  10/1960  Krantz et al. ........................ 260/467

Primary Examiner—Leland A. Sebastian
Attorney—Robert E. Burns et al.

[57] ABSTRACT

This invention relates to a method for preparing tetra-N,N,N',N'-(2-hydroxyethyl)-ethylenediamine tetranitrate of the general formula (I), and salts thereof, wherein the reaction is provided between a haloethyl-nitrate and ethylenediamine according to the scheme:

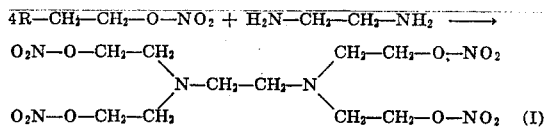

wherein R is a halogen, both in the presence and in the absence of a solvent, at a temperature between −5°C and 100°C.

5 Claims, No Drawings

METHOD FOR PREPARING TETRA-N,N,N',N'-(2-HYDROXYETHYL)-ETHYLENEDIAMINE TETRANITRATE AND SALTS THEREOF

This invention relates to a method for industrial preparation of tetra-N,N, N'N'-(2-hydroxyethyl) ethylenediamine-tetranitrate having the following formula:

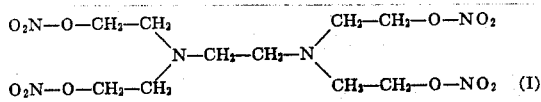 (I)

hereinafter referred to as tenitramine, and salts thereof, by reacting ethylenediamine and a haloethyl-nitrate, in the presence or absence of a solvent, and preferably, but not necessarily, in the presence of an accepter of the hydrogen halide formed in the reaction.

The compound obtained by the method according to the invention, which is a per se known product, exhibits a potent and quick coronary dilatating action comparable with that of trinitroglycerine, but having the advantage of a longer effective duration. Even at very high doses, tenitramine will not cause any notable changes in systemic blood pressure and heart rate and will not exert toxic symptoms or side effects in the course of therapeutic treatments over several months. Owing to its pharmacological and clinical features, tenitramine proved to be an effective drug capable of acting orally on the precordial painful symptomatology as caused by coronary failure or angina pectoris, both primary and secondary to any other cardiopathy, either as an emergency drug for its quick action, or as a maintaining or retaining therapy and of a preventive type due to its extended duration of action.

Heretofore, tenitramine was prepared by the classic method for preparing the nitroesters of linear or branched aliphatic primary alcohols. This classic preparation method contemplates reacting alcohol with fuming nitric acid or a sulphonitric mixture; Thus, for tenitramine preparation the reaction was heretofore carried out between tetra-N,N,N',N'(2-hydroxyethyl)-ethylenediamine and nitric acid or sulphonitric mixture. Even under the most varied experimental conditions, this reaction provided only low yields of the desired product owing to prevailing side reactions and oxidative phenomena.

In order to overcome these drawbacks, the present invention provides a method for preparing tenitramine of formula (I) and salts thereof, which can be carried out with high yields on an industrial scale. The product, as obtained by the method according to the invention, is extremely pure and stable.

The method according to the invention may be outlined as follows:

$$4R-CH_2-CH_2-O-NO_2 + H_2N-CH_2-CH_2-NH_2$$

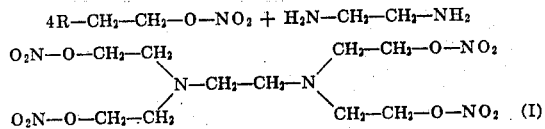 (I)

wherein R is a halogen.

The reaction of ethylenediamine and haloethyl-nitrate may be carried out both in the presence and in the absence of a solvent, preferably but not necessarily in the presence of an acceptor for the hydrogen halide formed in the reaction.

The optimum reaction temperature may vary between $-5°C$ and $100°C$ and depends upon the reaction being carried out in the presence or in the absence of a solvent and/or the solvent being used. The solvent may be selected from the following classes of compounds:

Primary, secondary or tertiary, linear or branched aliphatic alcohols, preferably having up to 6 carbon atoms; glycols and ethers thereof; alicyclic and aromatic hydrocarbons, such as cyclohexane and benzene; five and six membered saturated heterocyclic compounds containing one or two hetero-atoms, miscible and not with water, such as tetrahydrofuran and dioxane.

The acceptor for hydrogen halide may comprise an alkaline or alkaline-earth hydrate, an alkaline or alkaline-earth carbonate or bicarbonate, or heterocyclic base such as pyridine.

The amount of acceptor for the hydrogen halide being used during reaction may indifferently be stoichiometric for two or four hydrogen halide moles and in excess.

Tenitramine may be separated from the reaction mixture as a salt of a hydrogen halide, identical to or different from that formed in the reaction, or as a salt with other inorganic acids, such as sulphuric, phosphoric or nitric acid, or as a salt with a pharmaceutically acceptable mono- or polybasic organic acid or as the free base.

Separation for tenitramine salts may be accomplished by taking advantage of the different heat and cold solubility thereof in the reaction solvents or the insolubility thereof in apolar solvents or halogenated aliphatic solvents, subsequently added to the reaction mixture in suitable proportions.

The present invention will be better understood from the following detailed description, given by way of example in accordance with the following examples. However, the examples are intended to limiting the invention to the particular compounds as being specifically described. All art recognized equivalents are intended.

EXAMPLE I

To a stirred mixture of 552.2 gr. (4.4 moles) of (beta-chloroethyl)-nitrate and 317.4 gr. (2.3 moles) of anhydrous potassium carbonate was added dropwise, over a period of 60–90 minutes, 60 gr. (1 mole) of ethylenediamine, the reaction temperature being kept at 10–15°C. Within 1½–2 hours the temperature was allowed to gradually rise to room temperature, the reaction being continued at that temperature for an additional hour, and then the process was completed by heating to 60°C for 30 minutes.

The then cooled mixture was treated under stirring with 1500 ml. of anhydrous methanol. After about 30 minutes the potassium chloride and potassium carbonate excesses were removed by filtration and washed with anhydrous methanol. The combined filtrate and washings, containing tenitramine as a free base, were cooled under stirring at $-5°C$ and dropwise treated with 2.1 moles of concentrated nitric acid, the temperature being kept constant at −5° + 2°C.

Soon after the first drops, a definite cloud was observed in the methanol solution, from which the tenitramine dinitrate almost immediately separate as a whitish crystalline product. The mixture was filtered and the crystalline precipitate washed with cold methanol until neutral to congo red. The tenitramine dinitrate was crystallized from anhydrous methanol: 430 gr. (about 80% as calculated) of white crustals: m.p. 99–101°C.

EXAMPLE 2

To a stirred mixture at 25°C ± 2° of 748 gr. (4.4 moles) (beta-bromoethyl)-nitrate, 243.8 gr. (2.3 moles) anhydrous sodium carbonate and 1,500 ml. anhydrous methanol, was added over a period of 2 hr. a mixture of 60 gr. (1 mole) ethylenediamine and 500 ml. anhydrous methanol. The mixture was then refluxed for 1 hour.

After cooling and removal by suction of the inorganic salts, the process was continued as in Example 1 to obtain 425 gr. tenitramine dinitrate: (about 79% as calculated), m.p. 99–101°C.

EXAMPLE 3

To a stirred mixture of 552.2 gr. (4.4 moles) (beta-chloroethyl)-nitrate, 243.8 gr. (2.3 moles) anhydrous sodium carbonate and 2000 ml. dioxane was quickly added 60 gr. (1 mole) ethylenediamine. The mixture was quickly heated to reflux. After refluxing 5 minutes, the mixture was cooled and inorganic salts removed by suction. At 0°C ± 2°, the filtrate was slowly added under continuous stirring to 2.1 moles concentrated nitric acid to separate tenitramine as dinitrate. The complete precipitation was better achieved by adding to the mixture ethyl ether or an halogenated solvent, such as tetrachloroethane.

After crystallization of the raw product from anhydrous methanol, the tenitramine dinitrate yield was 450 gr., (about 83% as calculated) m.p. 99–101°C.

EXAMPLE 4

To a stirred mixture, cooled at 0°C, of 60 gr. (1 mole) ethylenediamine, 80 gr. (2 moles) sodium hydrate and 1,500 cc. anhydrous methanol was added over a period of 2 hours a mixture of 680 gr. (4 moles) (beta-bromoethyl)-nitrate and 500 ml. anhydrous methanol. The reaction was completed by heating the suspension at 40°C for 10 minutes. Still under stirring, 159 gr. (1.5 moles) sodium carbonate were then added, the mixture being allowed to react at room temperature for 3 hours. After removal of inorganic salts by suction, the process was continued as in Example 1, to obtain 420 gr. (about 79% as calculated) of tenitramine dinitrate, m.p. 99–101°C.

EXAMPLE 5

To a stirred mixture of 552.2 gr. (4.4 moles) (beta-chloroethyl)-nitrate and 347.6 gr. (4.4 moles) anhydrous pyridine was added dropwise, over a period of 60–90 minutes, 60 gr. (1 mole) ethylenediamine by keeping the reaction temperature at 10–15°C. After 1½–2 hours the temperature was allowed to gradually rise to room temperature, the reaction being continued at that temperature for an additional hour, and then the process was completed by heating at 60°C for 30 minutes.

After cooling to room temperature, 4,000 ml of ether are added, the suspension transferred to a funnel and extracted with several portion of water until no more chloride appeared in the aqueous washings.

After drying the ether solution on anhydrous sodium sulphate, 2,1 moles of concentrated nitric acid were added dropwise, under stirring and cooling at −5°±2°C.

Almost immediately the tenitramine dinitrate separated as slightly greasy crystals, which were then filtered by suction and washed with anhydrous ether. The product was thoroughly mixed with 500 ml. anhydrous methanol and filtered again. After crystallization from anhydrous methanol, 440 gr. (about 81% as calculated) of white crystals of yenitramine dinitrate were obtained, m.p. 99–101°C.

EXAMPLE 6

The following example discloses the composition of a tablet containing the compound of the present invention as active pharmacological ingredient:

| | |
|---|---|
| Tenitramine | 2.5 mgr. |
| Starch | 3. mgr |
| Talc | 4.5 mgr. |
| Lactose | 56 mgr |
| Avicel | 84 mgr. |

This tablet may be prepared by directly compressing the mixture, or by compressing a granulate as provided by wetting the mixture with an amount of water equivalent to 10% of the total mass, sieving the wet granulate through a suitable sieve and drying at a temperature not exceeding 40°C.

While the above examples (1–5) disclose the preparation of a salt which is illustrative of the compound according to the present invention and a specific dosage and pharmaceutic form (example 6) suitable for administration, it should be noted that the invention is not to be limited to the particular salt as described in the examples, or the particular described reaction conditions, or the particular excipients included in the pharmaceutic preparation, but should embrace changes or modifications thereof which are within the scope of the appended claims.

What is claimed is:

1. A method for preparing a compound of the general formula (I), and pharmaceutically acceptable salts thereof, wherein beta-haloethyl-nitrate and ethylenediamine are reacted at a temperature in the range − 5 – 100°C according to the scheme:

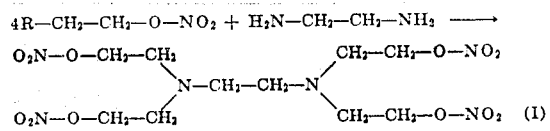

wherein R is a halogen.

2. A method according to claim 1, wherein the reaction is carried out in the presence of a hydrogen halide accepter.

3. A method according to claim 1, wherein the reaction is carried out in the presence of an alkaline carbonate and the said product is recovered as a salt by adding a mineral or organic acid to a solution in an organic solvent of said product as its base.

4. A method according to claim 1 wherein the reaction is carried out in the presence of an alkaline hydroxide or carbonate, in the presence of a solvent selected from the group of linear or branched primary, secondary or tertiary aliphatic alcohols having up to 5 carbon atoms; glycols; ethers of glycols; aromatic alicyclic hydrocarbons; 5 or 6 membered saturated heterocycles containing one or two hetero-atoms.

5. A method according to claim 1, wherein the reaction is carried out in the presence of a hydrogen halide accepting heterocyclic base.

* * * * *